(12) United States Patent
Jayasuriya et al.

(10) Patent No.: US 9,399,443 B2
(45) Date of Patent: Jul. 26, 2016

(54) DEPLOYABLE VEHICLE HOOD EXTENDER FOR PEDESTRIAN PROTECTION

(71) Applicant: Ford Global Technologies, LLC, Dearborn, MI (US)

(72) Inventors: Mangala A. Jayasuriya, Bloomfield Hills, MI (US); Richard Edward Ruthinowski, Taylor, MI (US); Brian Robert Spahn, Plymouth, MI (US); Thomas Joseph, Canton, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 0 days.

(21) Appl. No.: 14/472,749

(22) Filed: Aug. 29, 2014

(65) Prior Publication Data

US 2016/0059823 A1     Mar. 3, 2016

(51) Int. Cl.
*B60R 21/38* (2011.01)
*B62D 25/12* (2006.01)
*B60R 21/00* (2006.01)

(52) U.S. Cl.
CPC ............... *B60R 21/38* (2013.01); *B62D 25/12* (2013.01); *B60R 2021/0004* (2013.01); *B60R 2021/0048* (2013.01)

(58) Field of Classification Search
CPC  B60R 21/34; B60R 21/38; B60R 2021/0004; B60R 2021/0048; B60R 2021/343; B60R 2021/346; B62D 25/081; B62D 25/12; B60S 1/0405
See application file for complete search history.

(56) References Cited

U.S. PATENT DOCUMENTS

| | | | | |
|---|---|---|---|---|
| 3,226,756 A * | 1/1966 | Heiler | ..................... | 15/250.19 |
| 4,874,199 A * | 10/1989 | Yamamoto | ..................... | 296/192 |
| 6,182,782 B1 * | 2/2001 | Matsuura et al. | ............. | 180/274 |
| 6,237,992 B1 | 5/2001 | Howard | | |
| 6,415,883 B1 | 7/2002 | Myrholt et al. | | |
| 6,467,563 B1 * | 10/2002 | Ryan et al. | ..................... | 180/274 |
| 6,857,495 B2 | 2/2005 | Sawa | | |
| 7,997,375 B2 | 8/2011 | Shaw | | |

* cited by examiner

*Primary Examiner* — Ruth Ilan
*Assistant Examiner* — Timothy Wilhelm
(74) *Attorney, Agent, or Firm* — LeClairRyan

(57) ABSTRACT

A pedestrian protection apparatus for use with a motor vehicle having a windshield, a cowl and an engine hood is provided. The apparatus includes a deployable hood extender, movable between a stowed position within or beneath the hood and a deployed position, wherein the hood extender substantially overlaps the cowl or an area of increased component stiffness rearward of the vehicle hood and beneath at least a portion of the windshield. The hood extender may include a positional control portion, an energy absorbing portion, a bending control feature, and softened edges. The hood extender may be a single moveable panel or may comprise a plurality of moveable panels, strips or rod-like elements, wherein the plurality of elements may be rigidly or pivotally attached to one another for linear or rotational displacement between stowed and deployed positions. The hood extender may be an expandable lattice structure. An actuation lock is included.

11 Claims, 12 Drawing Sheets

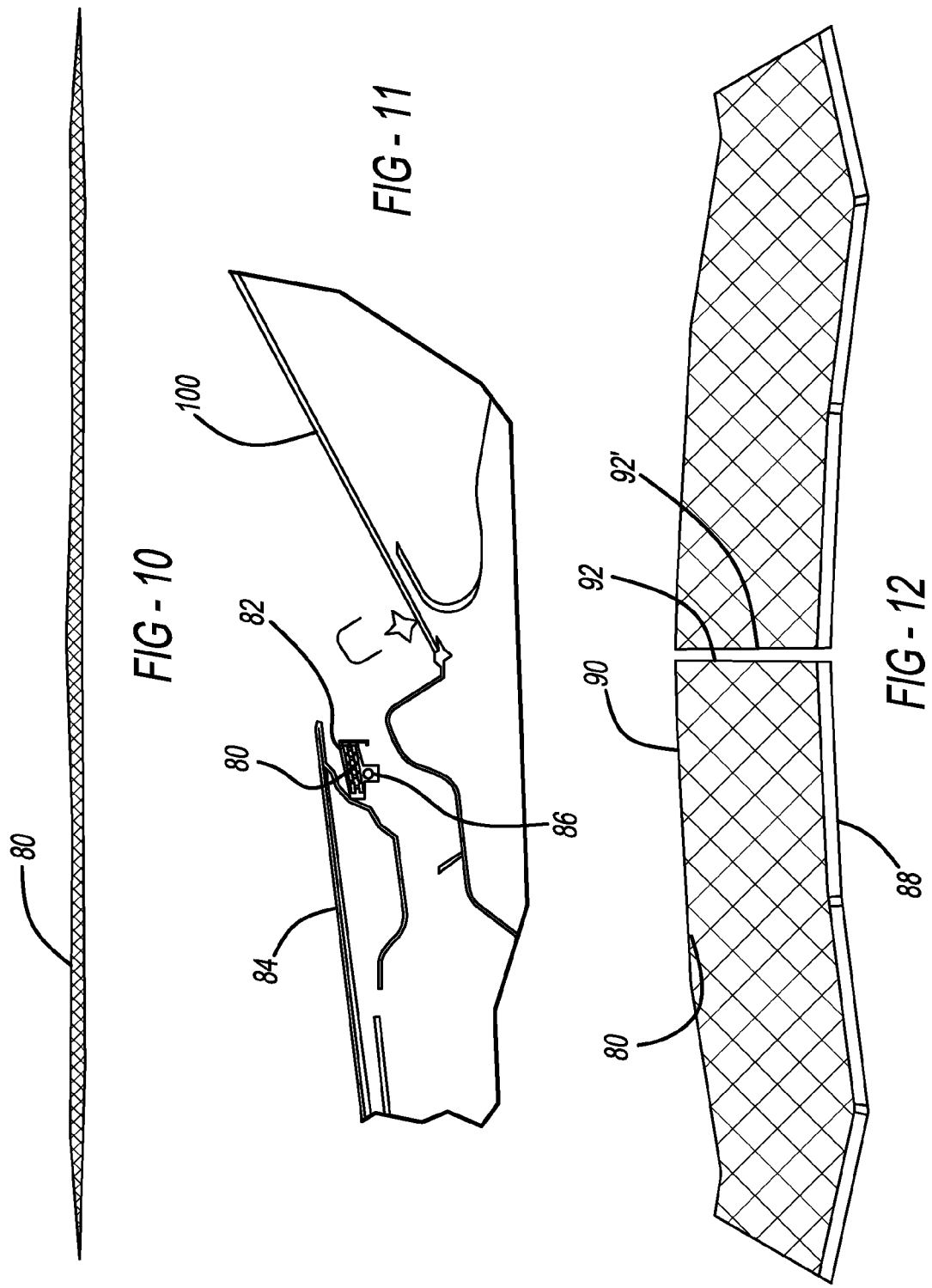

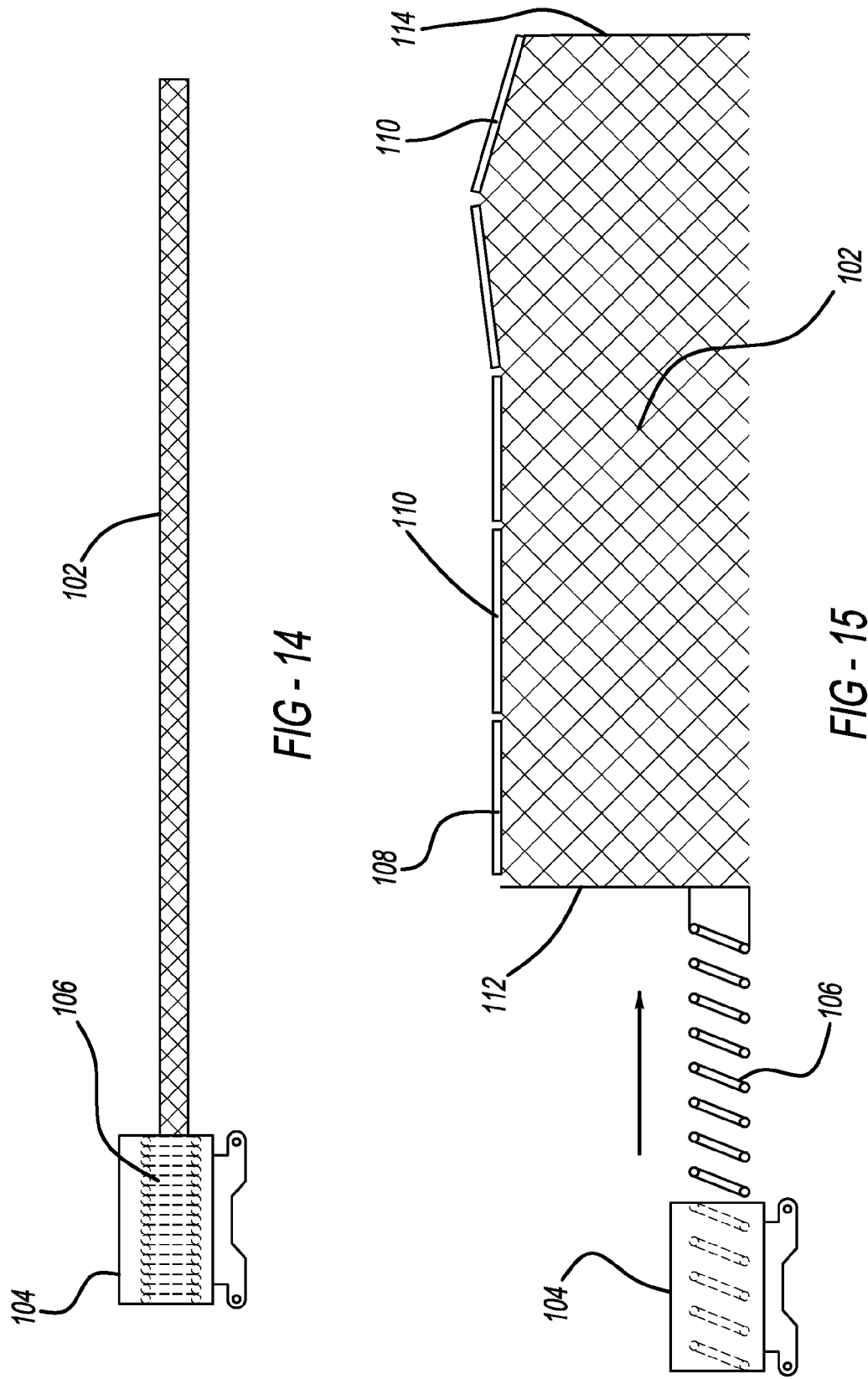

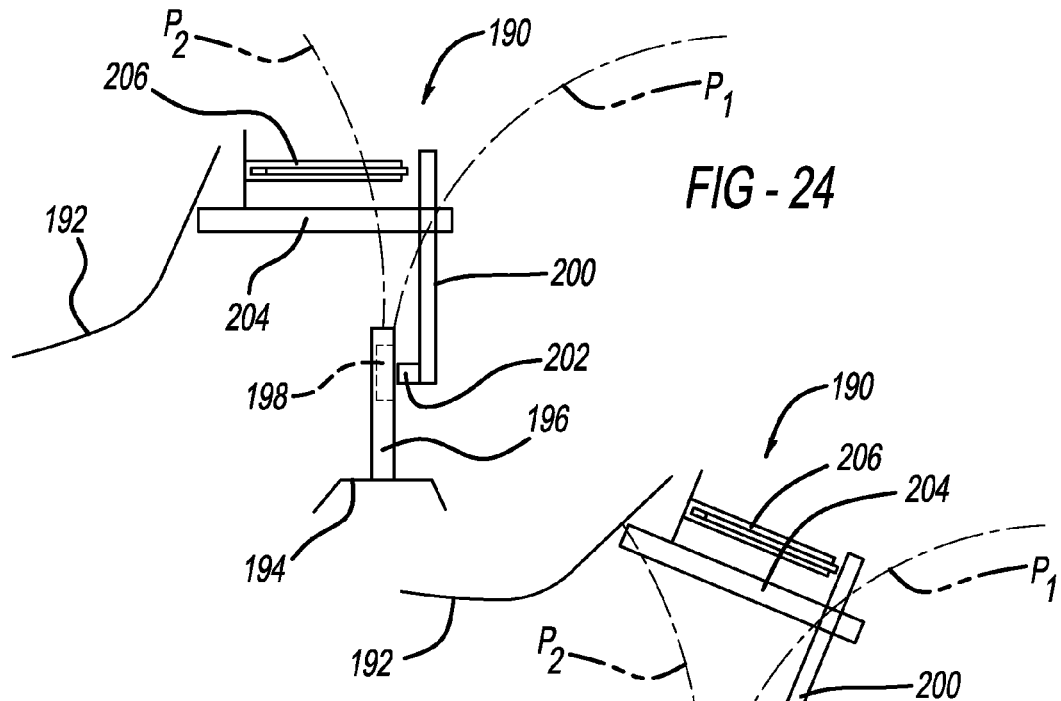
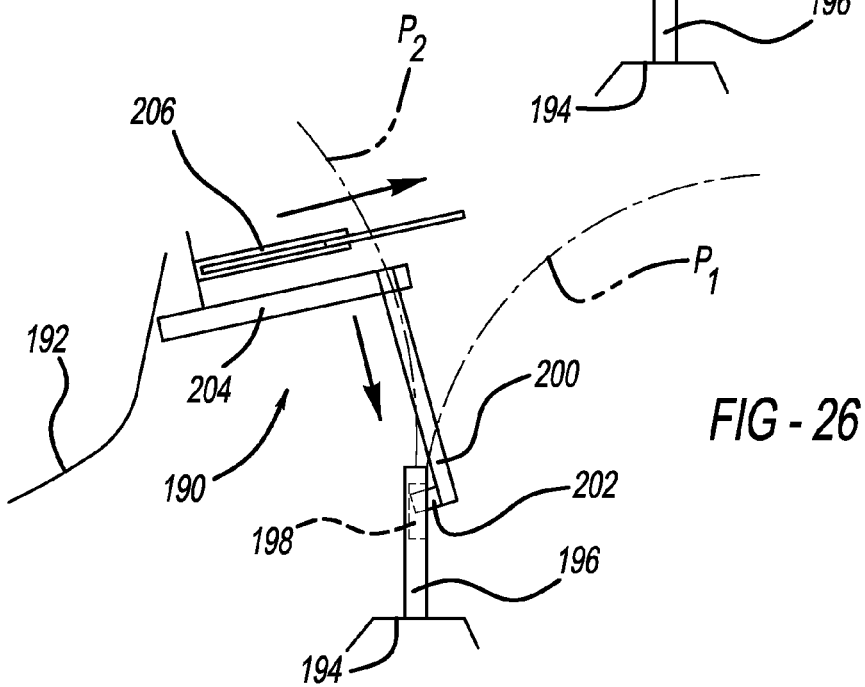

DEPLOYABLE VEHICLE HOOD EXTENDER FOR PEDESTRIAN PROTECTION

TECHNICAL FIELD

The disclosed inventive concept relates generally to pedestrian protection systems for automotive vehicles. More particularly, the disclosed inventive concept relates to a pedestrian protection system that includes one or more deployable hood extender members that are movable between a stowed position and a deployed position in the event of either a predicted or detected impact with a pedestrian.

BACKGROUND OF THE INVENTION

It has been estimated that for vehicle-to-pedestrian collisions eighty percent of serious injuries occur to the pedestrian's head. (Crandall et al., "Designing Road Vehicles for Pedestrian Protection," *BMJ* [formerly *British Medical Journal*], 324 [7346], pp. 1145-1148)

When impacted by a vehicle, a pedestrian's head may strike the vehicle's engine hood or windshield glass. Given the importance of minimizing injury to the pedestrian in pedestrian-vehicle impacts, pedestrian protection has become a goal of the United Nations Economic Commission for Europe. The UNECE advanced a proposal "to develop a global technical regulation concerning the protection of pedestrians and other vulnerable road users in collision with vehicles and final report on the development of the global technical regulation concerning pedestrian safety." Along with the Global Technical Regulation No. 9 (GTR-9), the European New Car Assessment Programme (Euro NCAP) developed a pedestrian protection star rating system. Vehicle manufacturers must meet child head, adult head, upper leg and lower leg test requirements provided to assess vehicle designs for mitigation of pedestrian injury caused by a vehicle frontal impact.

For laboratory testing evaluation, a pedestrian head form impact zone grid covering portions of the hood and windshield is defined as shown in FIG. 1 (http://www.euroncap.com/files/Euro-NCAP-Pedestrian-Protocol-v6.1-0-f2bd8d69-18e5-4779-9829-86a07299ae7e.pdf) and FIG. 2. The grid area on the windshield just rearward of the hood, generally above the cowl, is a challenging area for pedestrian protection due to the individual and collective stiffness of a variety of interior and exterior components adjacent or interfacing one another, such as a cowl, wipers, wiper motors, future vehicle hardware content and the like, as illustrated in FIG. 3.

In an effort to reduce injury to the pedestrian's head in a pedestrian-vehicle impact event, automotive engineers developed systems in which the trailing edge of the vehicle engine hood is raised through a variety of available lift mechanisms to provide earlier occupant head pick-up, additional head "ride-down" distance and enhanced energy dissipation through deformation of the elevated hood. However, while "hood lifting" technology provides some benefit to a struck pedestrian, such technologies do not address the vehicles stiffness rearward of the hood in the area of the windshield above instrument panel and cowl. Available countermeasures to reduce stiffness behind the hood or above the cowl include cowl airbags, softer instrument panel and foam covers at the cowl. These countermeasures can be costly, provide limited effectiveness and impose various design and appearance challenges.

Accordingly, there is a need for a practical and effective system to protect pedestrians in a pedestrian-vehicle impact event. As in so many areas of vehicle technology, there is room for improvement related to the protection of pedestrians in a pedestrian-vehicle impact event.

SUMMARY OF THE INVENTION

The disclosed inventive concept provides a solution to reduce the injury to a pedestrian's head when impacted by a motor vehicle. Particularly, the disclosed inventive concept provides an alternative countermeasure to reduce head injury for head impact positions near the rear trailing edge of the vehicle hood, such as above the cowl or similar area where vehicle hardware stiffness stack-up can be significant. This technology can potentially be offered at lower costs compared to existing cowl airbags. The design may be resettable, providing benefit in minor impact situations where no damage to the hood is incurred, and may enable cautionary near-imminent impact deployment at lower speeds. Unlike the cowl airbag, components need not be replaced if the hood has not been damaged in a minor impact event.

The pedestrian protection apparatus of the disclosed inventive concept is provided for use with a motor vehicle having a windshield, an engine hood and generally stiff, structural components or support members such as a cowl. The engine hood has a trailing edge and an underside adjacent the edge. The apparatus generally includes a deployable hood extender operatively associated with the underside of the trailing edge. The extender is movable between a stowed position and a deployed position. When in its deployed position, the hood extender substantially covers a structural member such as a cowl and at least a portion of the windshield. A mechanism such as a spring moves the hood extender from the stowed position to its deployed position.

The deployable hood extender of the disclosed inventive concept may be represented by any of several constructions. For example, the hood extender may include an anchor end, one or more hood extender bending control features formed into at least one element or member of the hood extender, an energy absorbing portion, and a softened tip. Alternatively, the deployable hood extender may comprise a plurality of adjacent strip or rod-like members, where any plurality of said members may be separated from one another by an intended gap. The deployable hood extender may also comprise a spring-operated lattice work construction.

As a further alternative, the deployable hood extender of the disclosed inventive concept may be a single, movable panel.

In an additional variation of the disclosed inventive concept, the deployable hood extender comprises a plurality of rotating flaps that individually rotate from the stowed position to the deployed position. A linkage is provided connecting the rotating flaps to effect rotation.

Another variation of the disclosed inventive concept incorporates fan-like hood extender panels that rotate from a stowed position to a deployed position.

In general, a single panel or plurality of members comprising a hood extender assembly may be stored in a housing fitted beneath, or contained between inner and outer panels of, the vehicle engine hood when in its stowed position.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 10 is a top view of a hood extender lattice shown in its collapsed, pre-deployed state according to an additional embodiment of the disclosed inventive concept;

FIG. 11 is a diagrammatic sectional view illustrating a hood extender lattice packaged under the vehicle hood in its collapsed, pre-deployed state;

FIG. 12 is a top view of a hood extender lattice shown in its deployed state;

FIG. 14 illustrates a portion of an alternate version of the hood extender lattice illustrated in its stowed state;

FIG. 15 illustrates the version of the hood extender lattice illustrated in FIG. 14 but in its expanded or deployed state;

FIG. 24 illustrates a diagrammatic hood extender lock that is positioned at the vehicle rearward end of the hood inner that is usable with the hood extenders of the disclosed inventive concept;

FIG. 25 illustrates the hood extender lock of FIG. 24 shown during normal hood operations in which a deployable hood extender remains constrained by the lock and travels with the engine hood when opening it for engine compartment access without permitting hood extender deployment deploy; and FIG. 26 illustrates a deployed hood extender and the hood extender retention member of the lock assembly of FIG. 24 shown in a disengaged position associated with "hood-lifting" after predicting or detecting a pedestrian impact.

DETAILED DESCRIPTION OF THE PREFERRED EMBODIMENT

Figure 1:
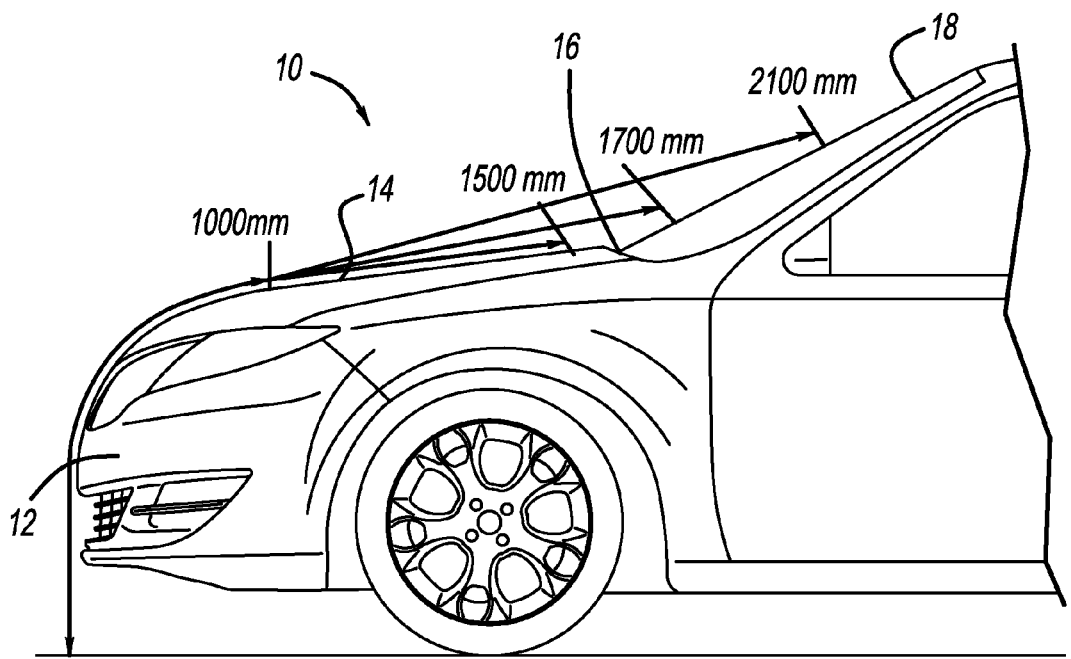
FIG. 1 is a side view of the front portion of a vehicle illustrating an example of a vehicle hood and windshield, wrap around distance and associated pedestrian head impact grid boundaries defined in EURONCAP testing requirements.

In the following figures, the same reference numerals will be used to refer to the same components. In the following description, various operating parameters and components are described for differently constructed embodiments. These specific parameters and components are included as examples and are not meant to be limiting.

In general, the disclosed invention provides an alternative pedestrian injury mitigation system for a vehicle that may provide a lighter weight, more cost-effective and potentially resettable solution, compared with known technologies, through the provision of a deployable hood extender assembly usable on a motor vehicle for pedestrian impact injury reduction.

Figure 3:
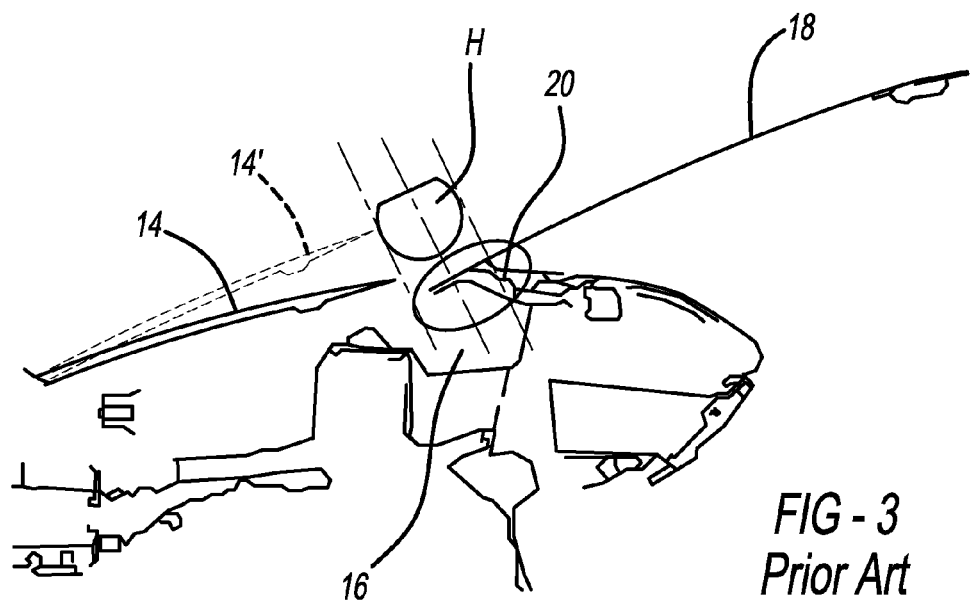
FIG. 3 is a diagrammatic sectional view showing an example head form impact path contained within the contact boundaries of the grid of FIG. 2, wherein the head form impact path is car-rearward of the leading edge of an elevated vehicle hood and generally above the cowl structure, according to the prior art.
Figure 2:
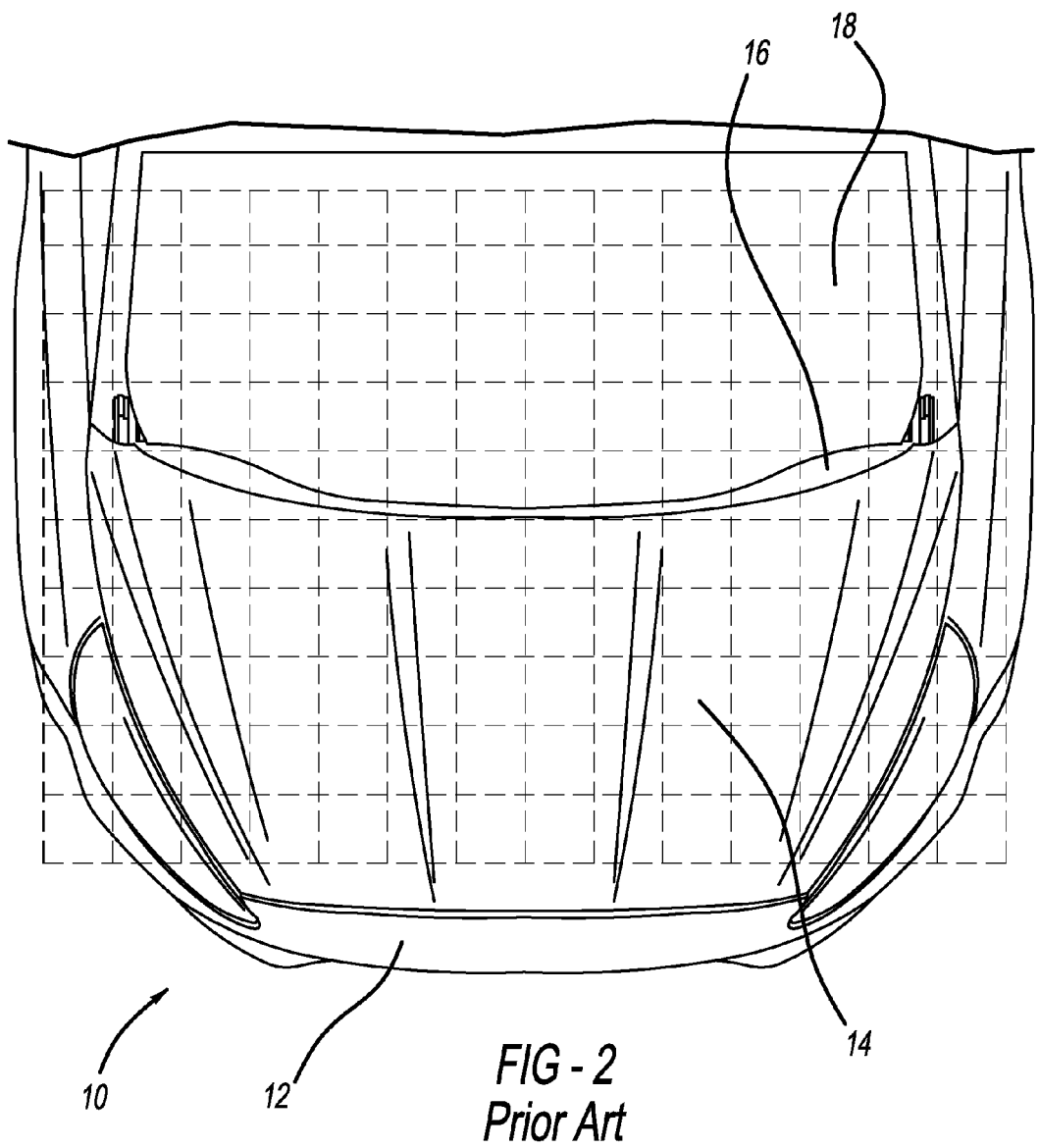
FIG. 2 is a top view of the front portion of a vehicle illustrating the head form impact location grid according to the EURONCAP requirement requirements.

As noted above, FIGS. 1 through 3 illustrate examples of the current state of development with respect to pedestrian frontal impact head protection systems. As shown in FIGS. 1 and 2, a vehicle, generally illustrated as 10, includes a front portion 12, an engine hood 14, a generally stiff area 16, such as would include a cowl structure generally located car-rearward of the trailing edge of the hood, and a windshield 18. FIG. 1 illustrates the "wrap around" distance associated with the head form impact grid that extends from the hood to the windshield. FIG. 3 shows hood 14 in an elevated "hood-lifted" position 14'. As noted above and as illustrated in FIG. 3, the impact grid area just rearward of the engine hood 14, often above a structural area or component such as the cowl 16 located below the windshield 18, is a challenging area for pedestrian protection due to the increased stiffness of the components typically found the area of the cowl 16, collectively defining an area of hard points 20. These components include, for example, windshield wiper arms and associated windshield wiper motors, and other stiff vehicle content. Referring to FIG. 3, it is upon impact with the area of hard points 20 that the pedestrian's head, represented by head form H, may suffer injury in a vehicle-pedestrian impact event.

Figure 4:
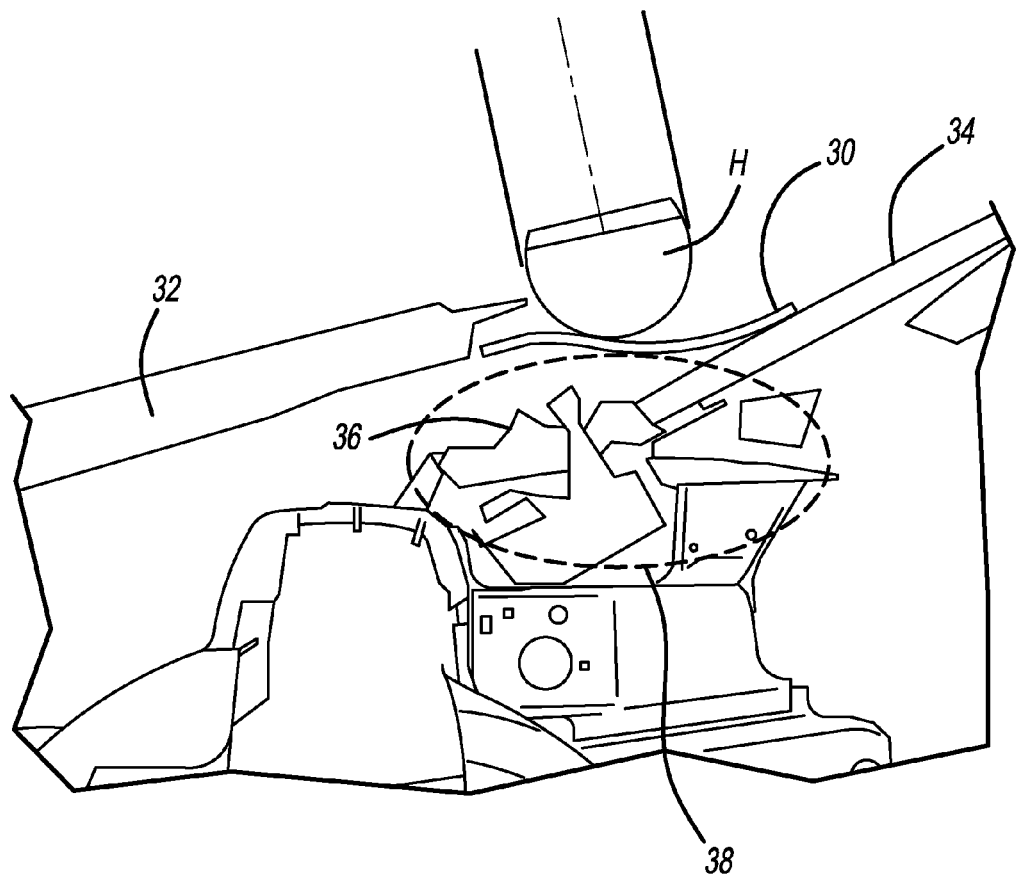
FIG. 4 is a view similar to that of FIG. 3 but illustrating a deployable hood extender in its deployed state according to the disclosed inventive concept.

In view of various challenges associated with the prior art, the focus of the disclosed inventive concept is to reduce injury when a pedestrian head or test head form H impacts the area of the hard points 20, as illustrated in FIG. 3. Current technologies such as "pop-up hoods" mitigate the head injury associated with impacting the engine hood 14. The deployable hood extender of the disclosed inventive concept will reduce the rate of displacement of a pedestrian's head and dissipate the impact energy above the area of hard points 20 located car rearward of the trailing edge of the hood as the hood extender and its associated operative elements deform while in contact with a pedestrian. This interaction may additionally reduce associated neck injury. The general idea of the disclosed inventive concept is illustrated in FIG. 4 in which a deployable hood extender 30 (which may represent a sectional view of a single extender panel, one of multiple adjacent panels, rods or similar extension elements or members having alternative geometries) is shown in its deployed state relative to an elevated vehicle engine hood 32 and an adjacent windshield 34. A cowl area 36 further incorporating hard points 38, such as windshield wiper motors and other relatively stiff vehicle components, is illustrated. As shown, the deployable hood extender 30 overlaps the cowl area 36 and areas of hard points 38 and a portion of the windshield 34 such that head form H does not impact directly upon either the cowl area 36 or the windshield 34 for this grid location.

Deployment of the hood extender 30 would generally be inhibited by such items as wiper arms when the engine hood 32 is in a closed position. Accordingly, the deployable hood extender 30 may be operatively associated with activation of a hood lifting capability at the hinged, windshield end of the hood 32 wherein the trailing edge of the engine hood 32 is lifted upon vehicle classification of an encountered or imminent pedestrian impact event. The elevated hood 32 and a head form trajectory aligned with hard points 38 is illustrated in FIG. 4. In this embodiment, initiation of hood extender 30 deployment occurs in association with the engine hood 32 lifting at the hinges. This allows the hood to open and close for normal maintenance and service without triggering activation of the deployable hood extender 32.

Figure 5:
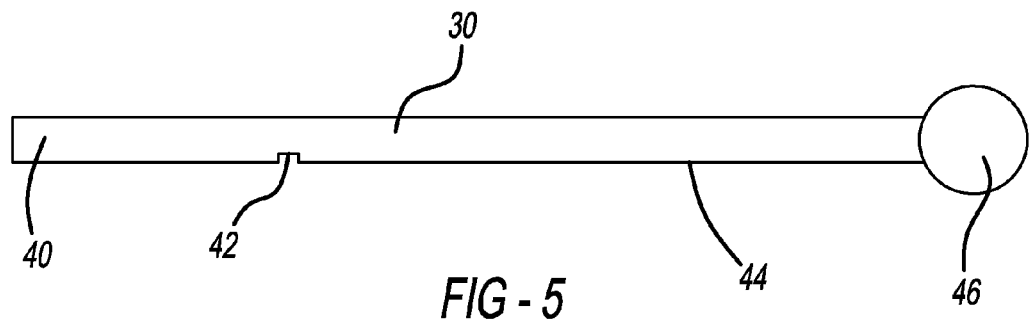
FIG. 5 is a cross-sectional view of a general version of a hood extender panel or member according to the disclosed inventive concept.

Features and components of a deployable hood extender, such as that of the hood extender member 30 of FIG. 4, are illustrated in FIG. 5 in which a deployable hood extender member 30 is shown from a side or side cross sectional view. The deployable hood extender 30 includes a displacement control portion 40 provided to permit displacement of the hood extender within a housing, guide path or channel disposed within or beneath the vehicle engine hood, wherein the displacement control portion operatively prevents separation/ejection of the hood extender from its guide path upon deployment. The displacement control portion may be represented by one or more features (not shown) such as a slot, hole, tab, pin, increased material thickness or alternative geometry, recess or protruding element provided on the hood extender member that engages a reciprocal clearance, recess, extension feature of the encapsulating housing, guide path, channel disposed within or beneath the vehicle engine hood to capture and retain the deployed hood extender member upon achieving a predetermined deployment displacement. Said otherwise, the displacement or positional control portion provides a positive displacement stop for a hood extender member 30. The deployable hood extender 30 may further include one or more bending control features 42 attached to, or formed into, the deployable hood extender 30 that regulates at least one location where the deployable hood extender 30 will bend upon impact. FIG. 5 depicts the bending control feature 42 as a material cross section change, for example. An energy absorbing portion, strip or panel 44 is provided to absorb pedestrian impact energy, such as from a head impact. Material selection, thickness, cross sectional geometry, segment lengths, spatial relationships, etc. of elements of the hood extender member 30 such as positional and bending control portion 40 and feature 42, and energy absorbing portion 44, may be altered to tune energy absorbing characteristics.

A "contact friendly" reduced stiffness edge covering for tip 46 may be provided along the exiting edge of the deployable hood extender 30 to seal a housing, guide channel/path opening when the deployable hood extender 30 is in its stowed state. Sealing may be provided for cosmetic or functional reasons, such as protecting the elements of hood extension subsystem from the environment. The reduced stiffness softened tip 46 may further provide softened contact with the windshield if there is contact on deployment or as a result of loading by a pedestrian and may further provide a safer edge condition for pedestrian head/facial contact. The reduced stiffness tip 46 may be composed of variety of plastic, rubber or polymerized-type materials satisfying functional purposes. Remaining elements of the hood extender member 30 may be comprised of any of a variety of deformable metallic, plastic or other rigid or semi-rigid materials capable of providing the intended functional performance capabilities. While not shown in sectional view, the softened tip 46 shown in association with the extending edge of a deployable element may also be provided on remaining peripheral edge of hood extending elements if desired.

While FIG. 5 illustrates the general concept of the deployable hood extender 30 according to the disclosed inventive concept, the deployable hood extender may be represented by a wide variety of embodiments, such as those shown in examples provided associated with FIGS. 6 through 23, discussed hereafter. Further, in general, extending elements may also provide coverage of a portion of the vehicle external a-pillars adjacent the windshield glass, though not shown in all figures.

Figure 6:
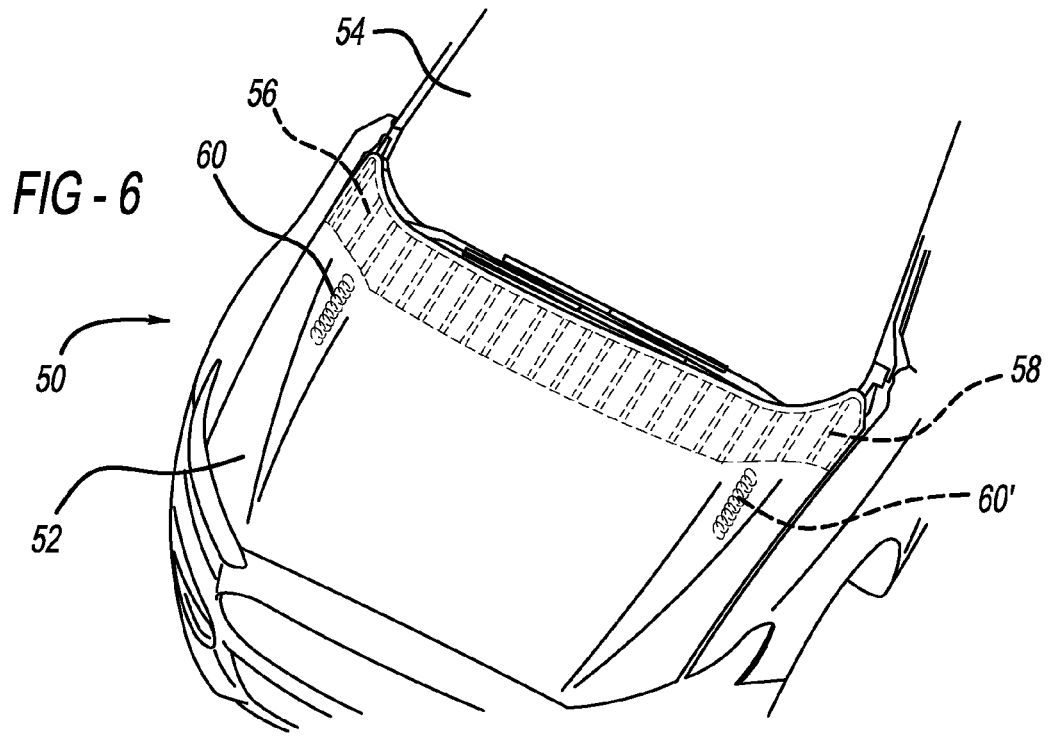
FIG. 6 is a perspective view of the forward portion of a vehicle having hood extender strips operatively associated with the vehicle hood according to an embodiment of the disclosed inventive concept.
Figure 7:
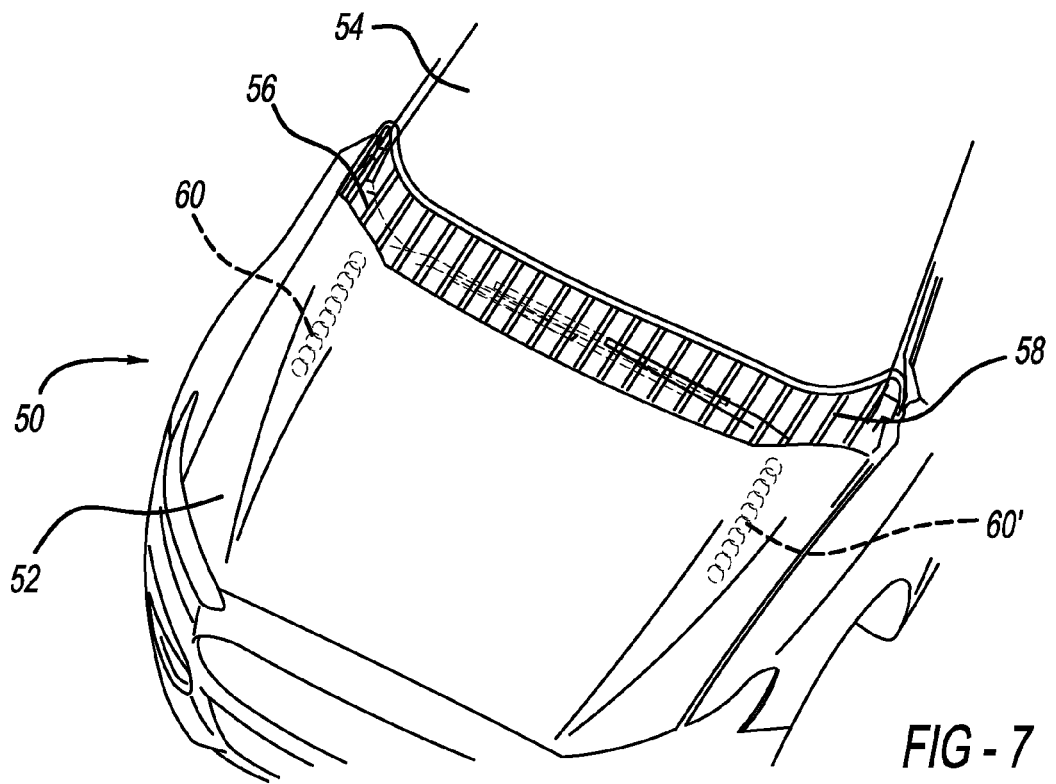
FIG. 7 is a view similar to that of FIG. 6 but illustrating the hood extender strips in their deployed state.

FIGS. 6 and 7 illustrate one of these embodiments. Referring to these figures, the forward portion of a vehicle, generally illustrated as 50, is shown. Forward vehicle portion 50 includes an engine hood 52 and a windshield 54. A deployable hood extender 56 comprises a series of parallel hood extender strips 58. The hood extender strips 58 are bound together to form the deployable hood extender 56.

FIG. 6 illustrates the deployable hood extender 56 in its stowed position prior to an impact with a pedestrian. If an impact occurs, a mechanism for deploying the deployable hood extender 56, such as springs 60 and 60', moves the deployable hood extender 56 to its deployed state as shown in FIG. 7. It is to be understood that other mechanisms for effecting movement of the deployable hood extender 56 from its stowed position to its deployed position may be adapted, such systems including, for example, electric, pneumatic or pyrotechnic or gas generating drivers (not illustrated). Further, similar actuation mechanisms may provide deployment capability for a variety of embodiments described or depicted in association with subsequent figures as are depicted or described in association with FIGS. 6 and 7, though not shown redundantly herein.

Figure 8:
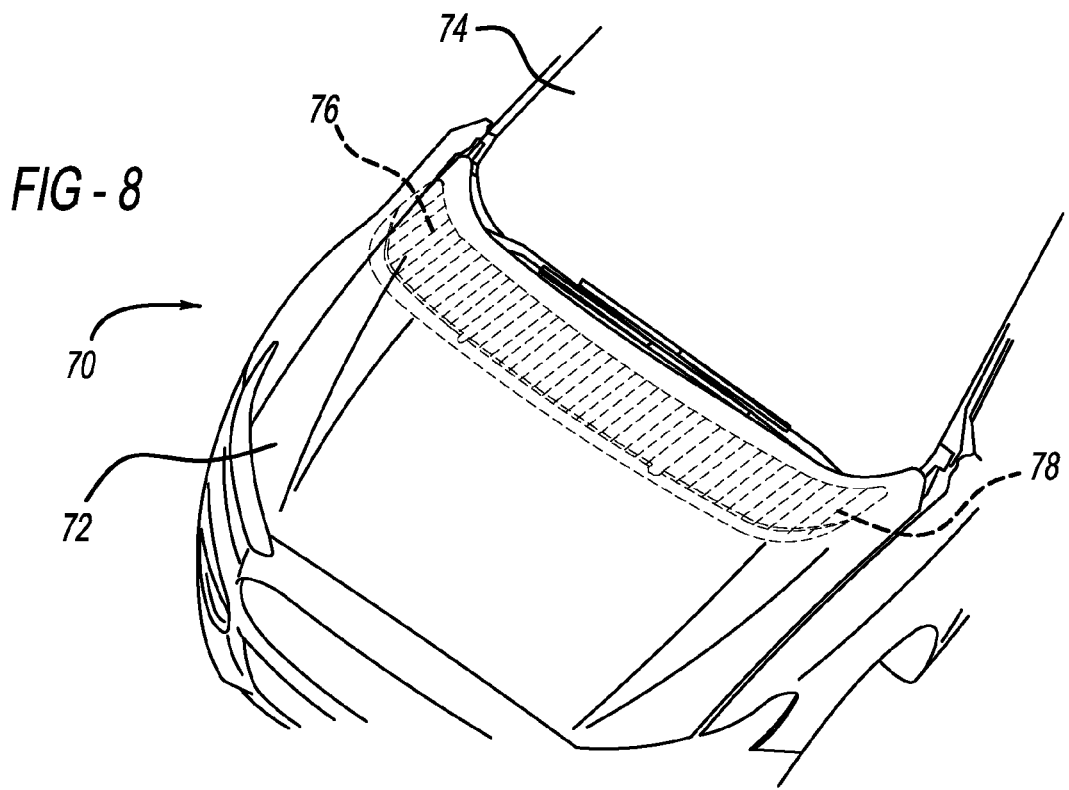
FIG. 8 is a perspective view of the forward portion of a vehicle having hood extender rods packaged inside the vehicle hood according to another embodiment of the disclosed inventive concept.
Figure 9:
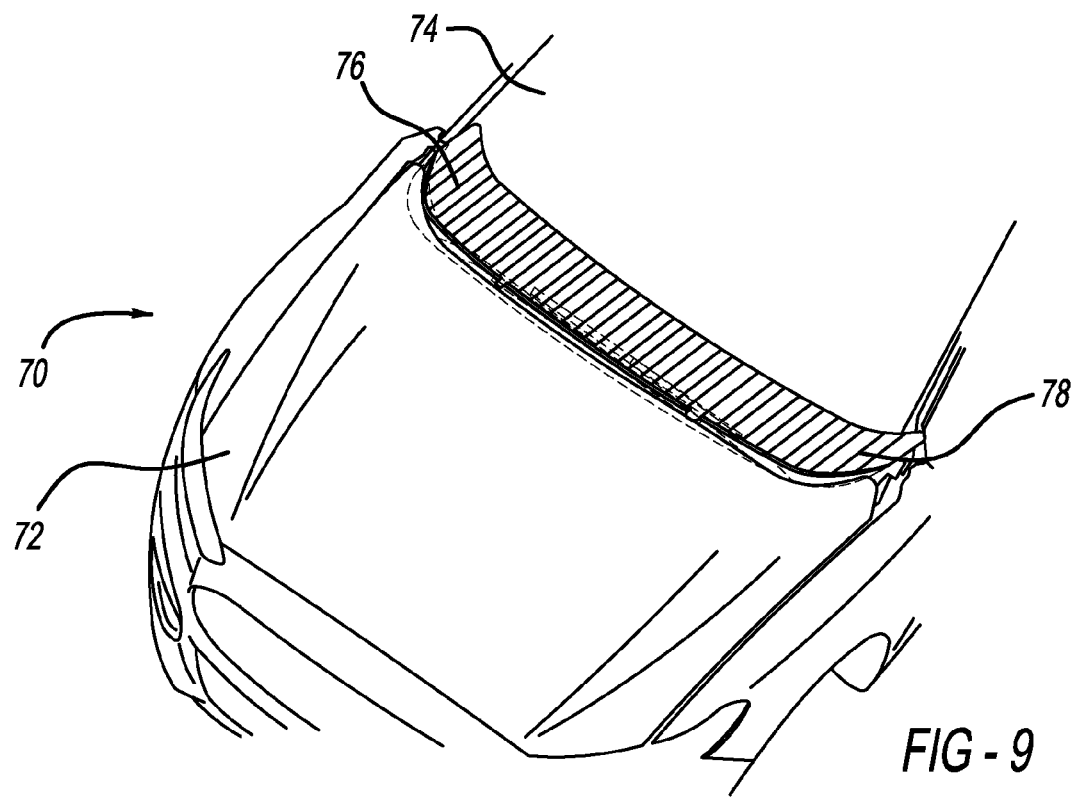
FIG. 9 is a view similar to that of FIG. 8 but illustrating the hood extender rods in their deployed state.

FIGS. 8 and 9 illustrate an alternate embodiment of the disclosed inventive concept. Referring to these figures, the forward portion of a vehicle, generally illustrated as 70, is shown. The vehicle 70 includes an engine hood 72 and a windshield 74. A deployable hood extender 76 can be viewed as being comprised of a series of adjacent, close proximity strips or panels or, spaced-apart hood extender elements 78 such as rods or especially narrow strips. The dotted lines of FIG. 8 and dark lines of FIG. 9 can represent small gaps between hood extender strips or panel elements or may represent especially narrow strips or rod elements themselves, with the white space between these lines representing either the elements themselves or the controlled gap between the elements. The spaced-apart hood extender elements 78 are bound together to form the deployable hood extender 76 and may be uniformly or non-uniformly spaced.

FIG. 8 illustrates the deployable hood extender 76 in its stowed position prior to an impact with a pedestrian. If an impact occurs, a mechanism for deploying the deployable hood extender 76, such as springs, electric, pneumatic, pyrotechnic or gas generating drivers (not shown), moves the deployable hood extender 76 to its deployed state as shown in FIG. 9.

FIGS. 10 through 15 illustrate an additional alternate embodiment of the disclosed inventive concept in which the deployable hood extender is comprised of a flexible lattice structure. The lattice may be composed of a variety of materials including, without limitation, carbon-reinforced polymer strands that define netting-like surface to engage a pedestrian's head to reduce the rate of head displacement, displace/reduce impact energy, etc. Referring to FIG. 10 particularly, a lattice structure 80 is shown along its length in its collapsed pre-deployed state. As illustrated, when in this state the lattice structure 80 is highly compact. FIG. 11 illustrates the lattice structure 80 packaged within a housing 82 that is positioned proximate to the trailing underside edge of an engine hood 84. While not shown in FIG. 11, the lattice structure may be housed within the hood, such as between upper and lower hood panel members. Windshield 100 and a lattice structure deployment lock are also shown in FIG. 11.

FIG. 11 further depicts a spring or alternative deployment actuation driver 86 positioned inside a housing 82, operatively associated with the lattice structure 80. Engine hood 84 is shown in its lifted state with lattice structure 80 not having yet been deployed. The specific timing of deployment of the hood extender relative to the timing and height of elevation of hood 84 are vehicle application dependent. Once deployed, the lattice structure 80 fans out as illustrated in FIG. 12 which shows the lattice structure 80 in its expanded state. The lattice structure 80 includes at least one retained edge 88 that remains attached to the housing 82 during and after deployment. The particular lattice structure 80 of FIG. 12 also includes an extendable edge 90, a first inner edge 92 and a second inner edge 92'. When the lattice structure 80 is deployed, the netting-like mesh of the lattice structure 80 is suspended and stretched taut between the retained edge 88, extended edge 90, the first inner edge 92 and the second inner edge 92'. While not shown, the lattice structure may also extend beyond the glass to the cover a portion of the windshield adjacent A-pillars.

Figure 13:
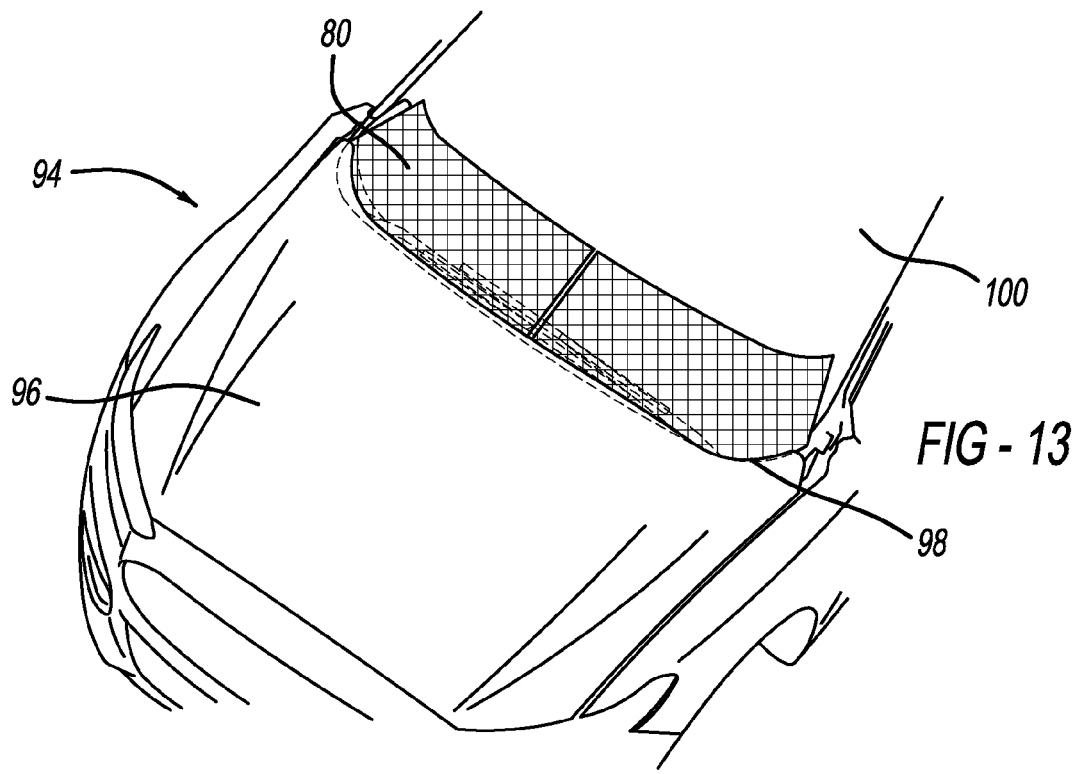
FIG. 13 is a perspective view of the forward portion of a vehicle having a hood extender lattice in its deployed state.

FIG. 13 illustrates the deployed lattice structure 80 in relation to the forward portion of a vehicle 94. The forward vehicle portion 94 includes an engine hood 96, a cowl area or area of increased structural and stacked-up hardware stiffness defined as area 98, and a windshield 100. As shown, the deployed lattice structure 80 extends above area 98 and spans a portion of the car forward end of the windshield 100.

The lattice structure 80 shown in FIGS. 12 and 13 represent a first suggested arrangement. FIGS. 14 and 15 illustrate an alternative version of the lattice structure. FIG. 14 illustrates a portion of this alternative version of the lattice structure in its stowed state while FIG. 15 illustrates a portion of this alternative version in its expanded or deployed state.

Referring to these figures, a lattice structure 102 is attached to a spring-loaded, telescoping deployment mechanism 104. The deployment mechanism 104 may be attached to any suitable place on the vehicle structure, generally near the lateral vehicle center. A spring 106 is attached at one end to the deployment mechanism 104 and at the other end to the lattice structure 102. On deployment, the tension on the spring 106 is released and it extends outward. This movement acts on the lattice structure 102 to cause a decrease in length but an increase in width as illustrated in FIG. 15.

The lattice structure 102 has an extending edge 108 that may be fitted with protective tips 110 that are visible when the lattice structure 102 is in its deployed state as illustrated in FIG. 15. The deployed lattice structure 102 also includes an inner edge 112 and an outer edge 114. Protective tips 110 may also be provided along edges 112 and 114, though not shown. While not shown, a pair of lattice structures 102 may be provided in association with a single deployment mechanism 104, such that in stowed positions lattice structures 102 would overlap one another in the cross car direction near the center of the vehicle. Deployment mechanism 104 could provide spring-loaded type actuation in two directions at once, propelling and expanding a first lattice structure towards the passenger side of the vehicle and a second structure towards the drivers side of the vehicle, resulting in the dual lattice structure configuration such as is shown in FIG. 13 where little post deployment cross car gap is shown between the two lattice structures.

Figure 16:
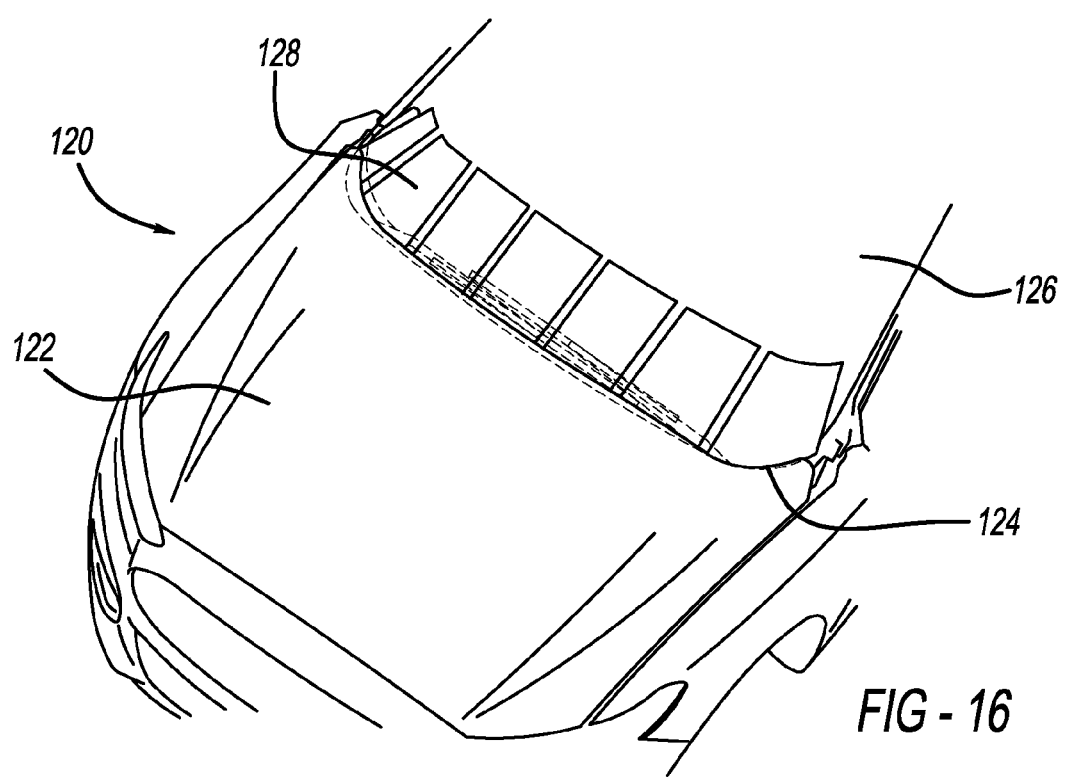
FIG. 16 is a perspective view of the forward portion of a vehicle illustrating a further additional embodiment of the disclosed inventive concept in which a series of hood extender panels are shown in their deployed state.
Figure 17:
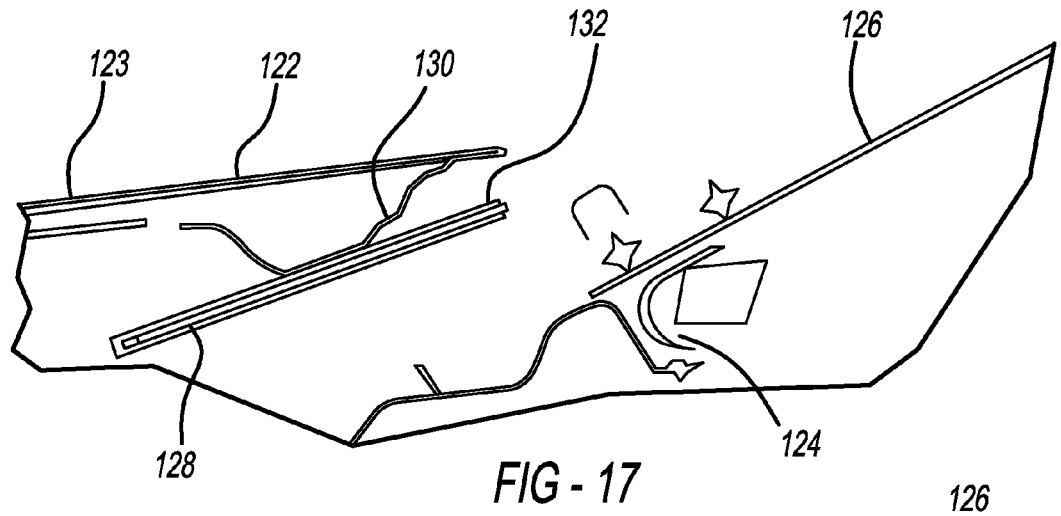
FIG. 17 is a diagrammatic sectional view illustrating one or more hood extender flaps, panels, rods or members packaged under the vehicle hood in their pre-deployed state.
Figure 18:
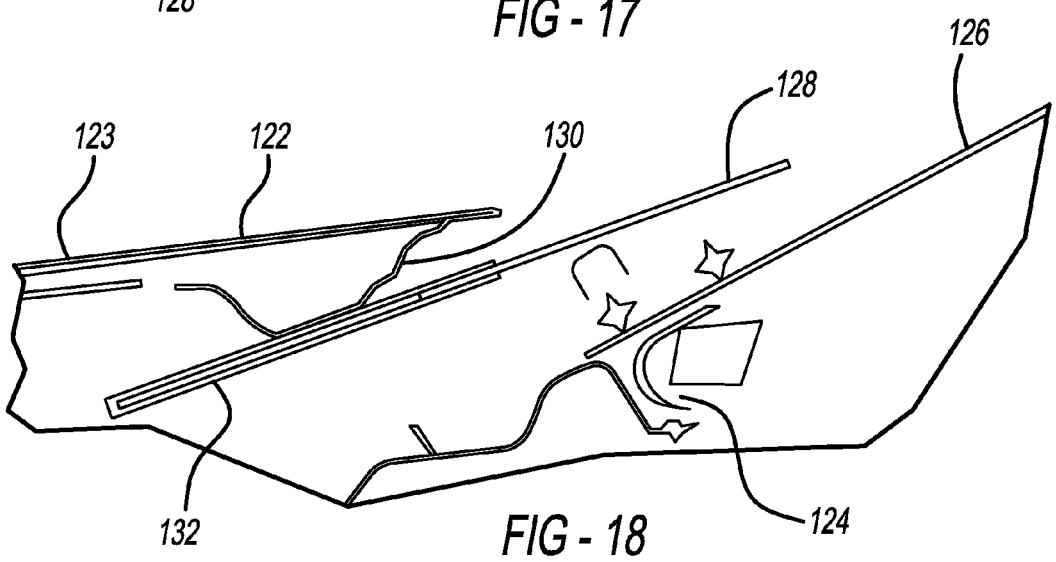
FIG. 18 is a view similar to that of FIG. 17 but showing the flaps, panels, rods or members in their deployed state.
Figure 19:
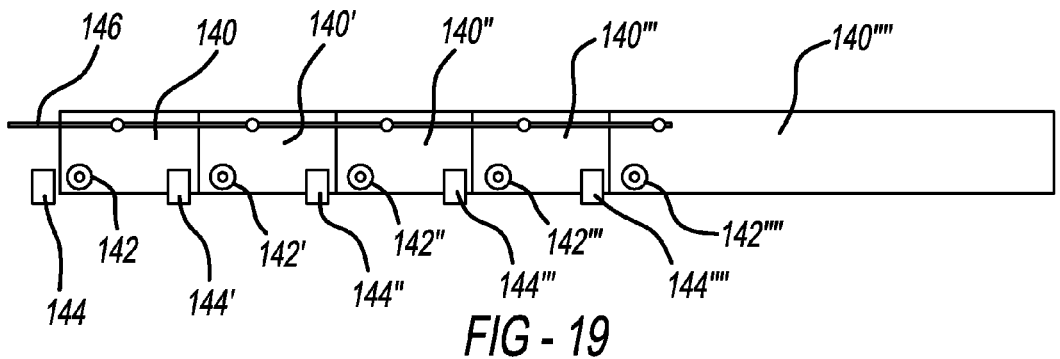
FIG. 19 illustrates a top view of a series of rotating flaps according to another embodiment of the disclosed inventive concept stowed under the vehicle hood in their pre-deployed state.
Figure 20:
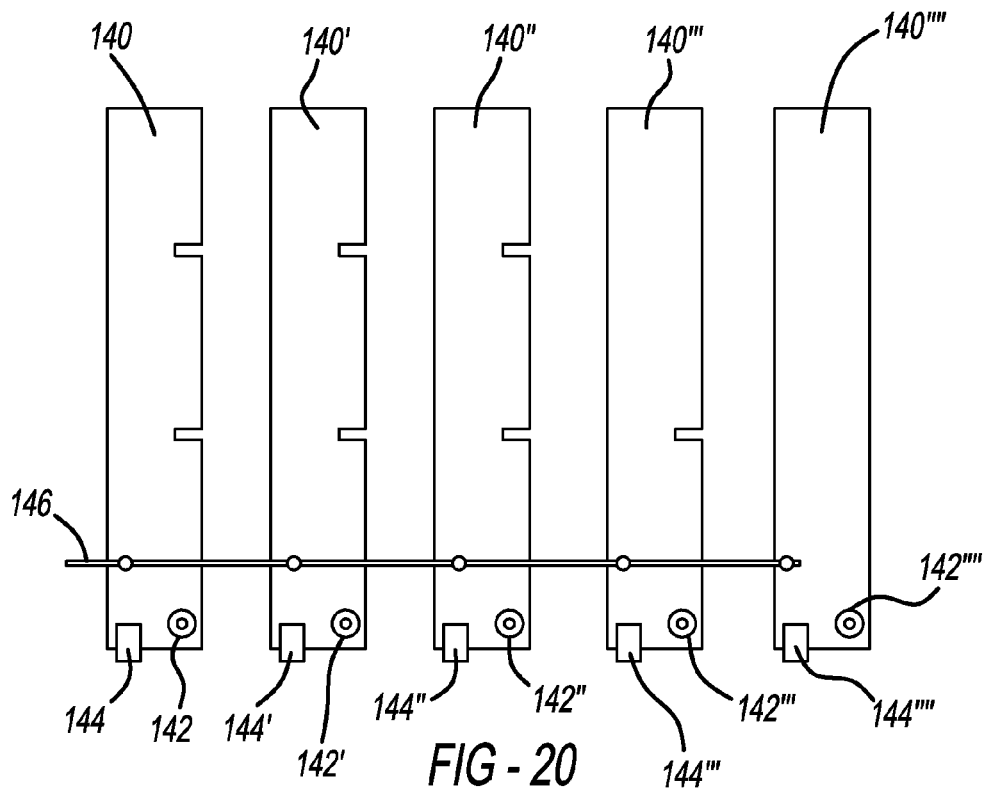
FIG. 20 illustrates a view similar to that of FIG. 19 but showing the rotating flaps in their fully deployed state.
Figure 21:
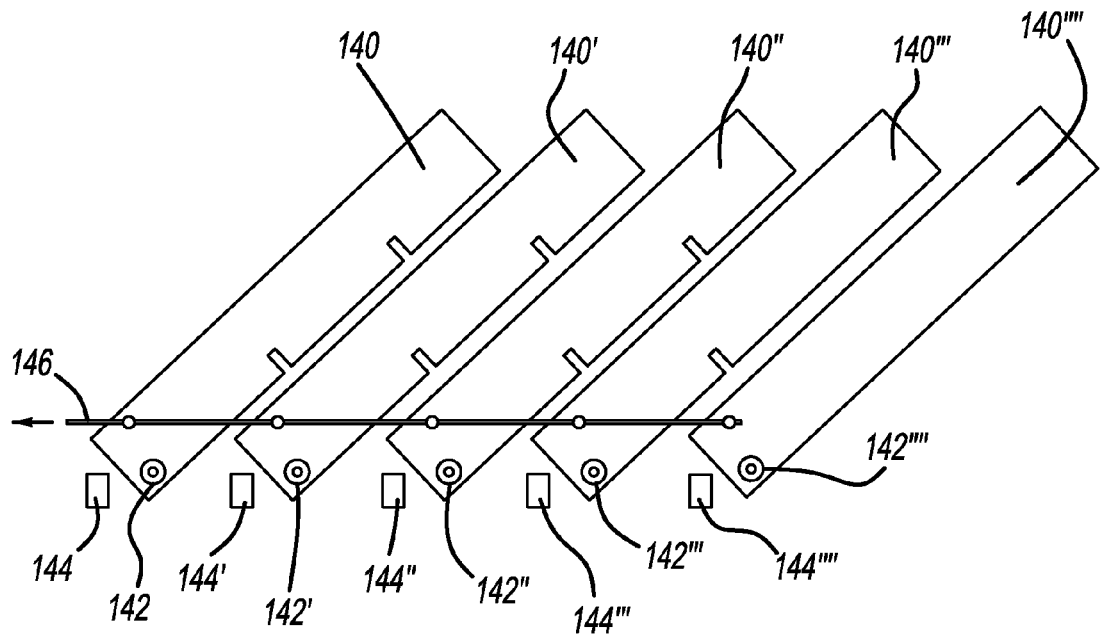
FIG. 21 illustrates a view similar to that of FIG. 20 but showing the rotating flaps in their partially deployed state.

Additional variations of the deployable hood extender are shown in FIGS. 16 through 20 illustrating various rigid or semi-rigid versions of the deployable hood extender panels or strips. FIG. 16 depicts a plurality of fewer but larger adjacent panels than shown in FIGS. 6 through 9. FIGS. 17 and 18 depict cross-sectional views of at least one hood extender panel, strip, rod or similar member packaged under the vehicle hood in pre-deployed and deployed states. Alternatively, while not shown, hood extender panels, rods, strips and the like may be housed between the upper and lower panels of a hood, and potentially partially contained within an a portion of the rear hood beam. FIGS. 19 through 21 illustrate an example of a plurality of adjoined rotatable hood extender flaps.

Referring to FIG. 16, a front portion of a vehicle 120 is illustrated. The vehicle front portion 120 includes an engine hood 122, a cowl or hard points area 124 and a windshield 126. A deployable hood extender 128 is shown in its deployed state covering the cowl area 124 and the leading edge of the windshield 126.

FIGS. 17 and 18 illustrate sectional views of the deployable hood extender 128 and the adjacent portions of an elevated engine hood 122, a cowl or hard points area 124 and windshield 126. The underside of the engine hood 122 includes a rear hood beam 130. When stowed in its pre-deployed state, the deployable hood extender 128 is disposed within a housing 132. The housing 132 is shown engaged with the rear hood beam 130, though a hood extender housing 132 may be provided between the upper hood panel 123 and rear hood beam 130. FIG. 17 illustrates the deployable hood extender 128 in its pre-deployed state stowed in the housing 132. FIG. 18 illustrates the deployable hood extender 128 in its deployed state, extending from housing 132 to cover cowl or hard points area 124 and a portion of the windshield 126.

FIGS. 19 through 21 illustrate another embodiment of the deployable hood extender of the disclosed inventive concept incorporating a plurality of pivotal hood extender panels. FIGS. 19 through 21 depict a series of rotating flaps 140, 140', 140", 140'" and 140"". While five rotating flaps are illustrated in the figures, it is to be understood that alternative flap geometry, quantity and spacing may be provided.

Flap 140 is pivotally attached to a pivot 142, the flap 140' is pivotally attached to a pivot 142', the flap 140" is pivotally attached to a pivot 142", the flap 140'" is pivotally attached to a pivot 142'", and the flap 140"" is pivotally attached to a pivot 142"". A like number of panel movement-limiting stops are provided in the form of stops 144, 144', 144", 144'" and 144"". A pulling linkage or cable 146 is connected to each of the flaps 140, 140', 140", 140'" and 140"".

FIG. 19 provides an example of flaps 140, 140', 140", 140"' and 140"" in a stowed, pre-deployed orientation contained within or below the vehicle rearward end of the engine hood. Upon activation, flaps 140, 140', 140", 140"' and 140"" rotate away from their stowed positions shown in FIG. 19 to a deployed state shown in FIG. 20 by way of operation of the pulling linkage or cable 146. An intermediate, partially deployed rotational position of flaps 140, 140', 140", 140"' and 140"" is shown in FIG. 21. Rotational movement of the panels flaps 140, 140', 140", 140"' and 140"" is limited by the stops 144, 144', 144", 144"' and 144"". FIG. 20 shows an example of the flaps in a fully deployed state, in contact with the aforementioned positional stops. The relative size, geometry, orientation, spacing, and other functional features or elements of the various members depicted or described in reference to FIGS. 19-21 may be altered to achieve desired application specific functional performance. A previously described softened tip may be provided at the outwardly extending or gapped edges of flaps 140-140"".

Figure 22:
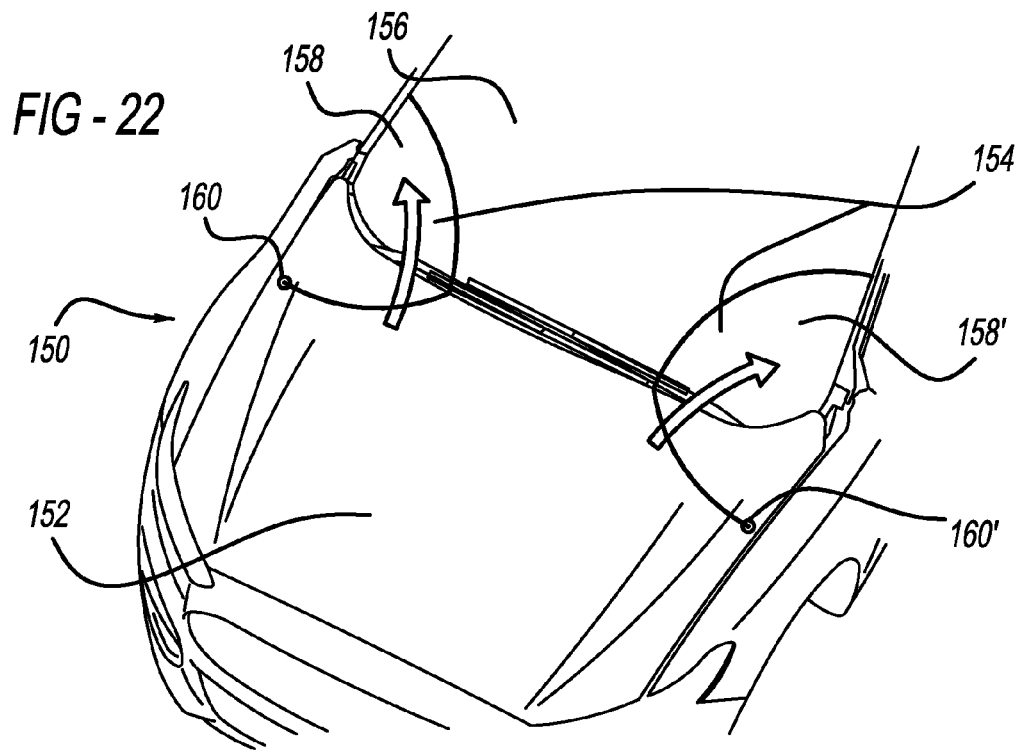
FIG. 22 illustrates a perspective view of the forward portion of a vehicle having fan-like hood extenders having outboard pivots operatively associated with the vehicle hood according to an embodiment of the disclosed inventive concept.
Figure 23:
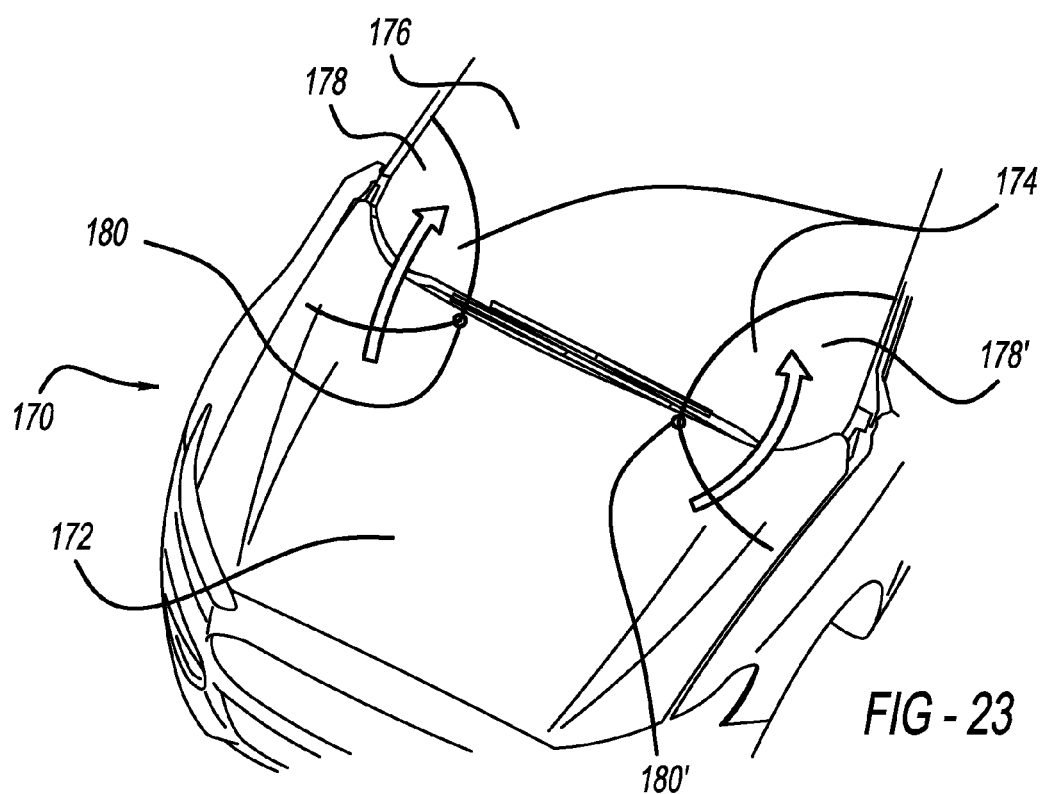
FIG. 23 illustrates an embodiment of the disclosed inventive concept similar to that shown in FIG. 22 but having inboard pivots.

FIGS. 22 and 23 illustrate alternative related embodiments of the hood extender of the disclosed inventive concept. Referring to FIG. 22, a forward portion of a vehicle 150 having an engine hood 152, a cowl area or area of locally increased structural and stacked-up hardware stiffness defined as area 154, and a windshield 156 are illustrated. A pair of semi-rigid and deformable, fan-like hood extenders 158 and 158' are illustrated in their deployed states, having rotated about outboard pivoting attachment points 160 and 160' respectively from their stowed positions that are relatively parallel to the underside of the engine hood 152. Thus deployed, the deformable hood extenders 158 and 158' cover a portion of the windshield 156. An air gap to allow for deformation is defined between the undersides of the deployed hood extenders 158 and 158' and the outer surface of the windshield 156.

A variation of the hood extender illustrated in FIG. 22 is shown in FIG. 23. With reference thereto, a forward portion of a vehicle 170 having an engine hood 172, a cowl area or area of locally increased structural and stacked-up hardware stiffness defined as area 174, and a windshield 176 is illustrated. A pair of semi-rigid and deformable hood extenders 178 and 178' are illustrated in their deployed states, having rotated at inboard pivoting attachment points 180 and 180' respectively from their stowed positions that are relatively horizontal to the underside of the engine hood 172. The deployed deformable hood extenders 178 and 178' cover a portion of the windshield 176. As is the case with the embodiment illustrated in FIG. 22 and discussed in relation thereto, an air gap to allow for deformation is defined between the undersides of the deployed hood extenders 178 and 178' and the outer surface of the windshield 176. The shape of the fan-like extender panels, and pivot point locations of FIGS. 22 and 23 are provided for illustrative purposes only as the profile and positional adjustments would be made to package the panels and permit rotation as required.

Each of the above designs includes an activation mechanism, such as compressed springs, a motor, pneumatic, pyrotechnic or gas generating actuator to deploy a hood extender. A hood extender lock is provided to release the hood extender in the event of a pedestrian impact.

A hood extender lock assembly, generally illustrated as 190, is illustrated in FIGS. 24 through 26. Referring to FIG. 24, the hood extender lock assembly 190 is shown in relation to a hood inner 192 and a vehicle body structure element 194. The hood extender lock assembly 190 includes a sliding arm catch surface 196 having an aperture 198 formed therein. A sliding arm 200, having protrusion 202 (such as a hook), is operatively associated with a sliding arm support bracket 204. While support bracket 204 is shown extending from hood inner 192 in FIGS. 24-26, the bracket may be attached or integral to either of an underside surface of the vehicle hood, or instead to a member of a hood extender housing to achieve greater efficiency in design. Support bracket 204 includes an aperture (not shown in sectional view) within which sliding arm 200 is moveable under select operating conditions. A hood extender contained within housing 206 is also illustrated. It is to be understood that the hood extender 206 may be any of the hood extenders illustrated and discussed above. Further, the scale of FIGS. 24-26 intentionally accentuates the size of the lock assembly 190 elements relative to the hood extender and housing 206 for discussion purposes.

The engine hood needs to open normally for ordinary engine compartment access and maintenance without permitting release of a mechanically restrained hood extender upon lifting the hood. The normal lock-engaged operating position of the hood extender lock assembly 190 is illustrated in FIG. 25 in which the sliding arm 200, including protrusion 202, maintains a fixed position relative to bracket 204 and housing 206 as the hood is rotated about its hinges along normal use trajectory $P_1$. Sliding arm 206 is shown moving away from the aperture 198 of sliding arm catch surface 196. Thus FIG. 25 illustrates sliding arm 200 of the hood extender lock assembly 190 retaining the hood extender in its stowed position when opening the vehicle hood.

Hood extender actuation is reliant upon pedestrian impact prediction or detection, resulting in activation of vehicle hood-lifting technology at the hinged windshield end of the hood to provide an unobstructed exit path for hood extender deployment. In this case, the engine hood generally rotates about the front hood latch striker when lifted at the hinged windshield end of the hood, as is known in the art. Hood lifting can provide ~100 mm of lift at the hinged windshield end to facilitate reduction in pedestrian-to-hood impact injury. As the engine hood starts to lift near the hinges along hood-lifting trajectory $P_2$, protrusion 202 of the sliding arm 200 engages the aperture 198 formed in the sliding arm catch surface 196 as illustrated in FIG. 26. Once engaged, sliding arm 200 is held down relative to the support bracket 204 as the hood is lifted, thus releasing the hood extender from housing 206. It is to be understood that while a single hood extender lock assembly 190 is illustrated, a plurality of locks may be employed as needed. Further, while not shown, the lock assembly could be reoriented or configured to attach a simple cable to a retention member such as the sliding arm 200, where the cable is mechanically attached to a portion of the hood lifting hinge, such that upon deploying the hood lifter and separating and expanding the hood hinges, the attached cable would pull sliding arm 200 from its resting position, but only in instances of hood lifter actuation. For this type of configuration, the need to balance and tune component geometries, spatial relationships and tolerances between the hood and extender, the lock assembly and the vehicle structure associated with the normal hood operation and hood-lifted rotational motion trajectories would not be necessary.

Thus the disclosed invention as set forth above overcomes various challenges faced by known pedestrian protection systems for vehicles by further expanding the area of pedestrian-vehicle frontal impact protection and by reducing injury severity for select pedestrian impact positions associated with areas of significant vehicle content stiffness located rearward of the trailing edge of the vehicle engine hood. However, one skilled in the art will readily recognize from such discussion, and from the accompanying drawings and claims that various changes, modifications and variations can be incorporated without departing from the true spirit and fair scope of the invention as defined by the following claims.

What is claimed is:

1. A pedestrian protection apparatus for a motor vehicle having a windshield, a cowl, a hood having a trailing edge, and an underside adjacent the edge, the apparatus comprising:
a deployable hood extender operatively associated with the underside of the trailing edge, said hood extender being movable between a stowed position and a deployed position that substantially covers the cowl and a portion of the windshield, said extender comprising a housing and a lattice structure extendable therefrom, said lattice structure having a retained edge attached to said housing;
an actuator for moving said hood extender; and
a displacement lock to restrain said hood extender under a first operational condition and release said hood extender under a second operational condition.

2. The pedestrian protection apparatus of claim 1 wherein said actuator is selected from the group consisting of a mechanical spring, an electric motor, a pneumatic actuator, a pyrotechnic device and a gas generating device.

3. The pedestrian protection apparatus of claim 1 wherein said deployable hood extender includes at least one of a positional control portion, a hood extender bending control feature, an energy absorbing portion, and a softened edge.

4. The pedestrian protection apparatus of claim 1 further including a housing within which said hood extender is stored when in its stowed position.

5. The pedestrian protection apparatus of claim 1 further including a linkage connecting said rotating flaps to effect rotation.

6. A pedestrian protection apparatus for a vehicle having forward and rearward portions, a hood, a windshield, and an area having substantial collective stiffness behind the hood and below the windshield, the apparatus comprising:
a hood extender associated with the hood, said extender being movable between stowed and deployed positions and substantially overlapping the stiff area and a windshield portion when in said deployed position, said extender comprises a plurality of members selected from the group consisting of side-by-side, elongated panels movable from a stowed position in which said panels to not extend over the windshield to an extended position in which said panels partially extend over the windshield, said panels being rigid or semi-rigid and having a fixed shape;
an actuator for moving said extender between said positions; and
a displacement lock to restrain said hood extender under a first operational condition and release said hood extender under a second operational condition.

7. The pedestrian protection apparatus of claim 6 wherein said actuator is selected from the group consisting of a mechanical spring, an electric motor, a pneumatic actuator, a pyrotechnic device and a gas generating device.

8. The pedestrian protection apparatus of claim 6 wherein said deployable hood extender includes at least one of a positional control portion, a hood extender bending control feature, an energy absorbing portion, and a softened edge.

9. The pedestrian protection apparatus of claim 6 wherein said vehicle further includes an engine compartment located beneath said hood and a pedestrian protection hood-lifting mechanism, and wherein said apparatus further includes a deployment lock provided to restrain said hood extender when rotating said hood into an engine compartment accessible position such as would be provided for maintenance, said deployment lock further capable of releasing said hood extender from said stowed position in association with the actuation of said hood-lifting mechanism.

10. The pedestrian protection apparatus of claim 6 wherein said hood further includes an upper panel, a lower panel, a vehicle rearward edge and an underside adjacent the edge, said apparatus incorporating a hood extender enclosure within which said hood extender is stored when in its stowed position, said enclosure being selected from the group consisting of a housing attachable to the underside of said hood, a housing at least partially formed into the underside of said hood, and a housing integrally formed between said upper and lower panels of said hood.

11. The pedestrian protection apparatus of claim 6 wherein said deployable hood extender comprises a plurality of rotating panels that articulate from a first stowed position to a second deployed position by way of a method selected from the group consisting of individually rotating said panels and wherein a linkage connecting said rotating panels is provided to effect collective simultaneous rotation of said panels.

\* \* \* \* \*